United States Patent [19]
Gubisch et al.

[11] 4,088,625
[45] May 9, 1978

[54] PROCESS FOR THE PRODUCTION OF A PULVERULENT, TRICKLABLE MIXTURE OF ETHYLENE/VINYL ACETATE COPOLYMER AND POWDERY POLYVINYLCHLORIDE

[75] Inventors: Erwin Gubisch; Walter Kudlich; Walter Popp; Herbert Reinicke, all of Burghausen, Germany

[73] Assignee: Wacker Chemie GmbH, Munich, Germany

[21] Appl. No.: 716,106

[22] Filed: Aug. 20, 1976

[30] Foreign Application Priority Data

Sep. 10, 1975 Germany .............................. 2540378

[51] Int. Cl.² ............................................. C08L 23/08
[52] U.S. Cl. ...................... 260/42; 260/17.4 R; 260/42.49; 260/897 C; 528/502; 528/503; 526/88; 526/920; 526/922
[58] Field of Search ............ 260/897 C, 42.49, 42.46, 260/42

[56] References Cited

U.S. PATENT DOCUMENTS 3,125,545  3/1964  Van Cleve et al. ............. 260/897 C
3,864,432  2/1975  Adler et al. ......................... 260/897

*Primary Examiner*—Carman J. Seccuro
*Attorney, Agent, or Firm*—Hammond & Littell

[57] ABSTRACT

A process for the production of a pulverulent, tricklable mixture of ethylene/vinyl acetate copolymer and polyvinylchloride comprising the steps of mixing a mixture consisting essentially of (a) an ethylene/vinyl acetate copolymer having an acetate content of from 15% to 75% by weight, (b) powdery polyvinylchloride, in a mixture ratio of (a) to (b) of 1:3 to 2:1, and (c) from 0 to 5% by weight of the mixture of additives customary for polymer processing, in a high-speed mixture at temperatures above the softening temperature of said polyvinylchloride and below 170° C, for a time sufficient to effect homogenization, quenching said homogenized mixture with water and removing the water, grinding the quenched product with the addition of from 0.5 to 10 parts by weight of an inert powder having particles in the submicroscopic range, in a high speed mill under passage of an airstream which is heated by friction, and recovering said pulverulent, tricklable mixture; as well as the powdery mixture so produced.

6 Claims, No Drawings

4,088,625

PROCESS FOR THE PRODUCTION OF A PULVERULENT, TRICKLABLE MIXTURE OF ETHYLENE/VINYL ACETATE COPOLYMER AND POWDERY POLYVINYLCHLORIDE

RELATED ART

The production of homogeneous mixtures of polyvinyl chloride with ethylene/vinyl acetate copolymers, which copolymers improve the impact resistance of the molded article, still presents a problem because of the differing plastic behavior of the two components. As a result of the tacky and elastic properties of the elastomers on the one hand and the inflexible behavior of the PVC polymers to be modified on the other hand, the processes for the production of homogeneous mixtures have always been based on homogenization by rollers and kneaders. By this method it is possible to incorporate, for example, an ethylene/vinyl acetate copolymer content of up to 23% by weight in the PVC polymer. Higher contents of ethylene/vinyl acetate copolymers cannot be obtained because of the tackiness of the mixtures. This difficulty can be overcome by the use of the technique of graft polymerization, for example. In the case of graft polymers of vinyl chloride on ethylene/vinyl acetate copolymers, those with 10% or 50% by weight of ethylene/vinyl acetate are customary.

Furthermore, the homogenization of coarse-particled, high-molecular-weight elastomeric substances is known where at least 25% by weight of pulverulent additives, such as, for example, carbon black, chalk, talcum, etc., must also be incorporated in order to obtain generally tricklable or free-flowing mixtures.

OBJECTS OF THE INVENTION

An object of the present invention is the development of a process to produce free-flowing mixtures of ethylene/vinyl acetate copolymers and pulverulent polyvinyl chloride, which mixtures have a high content of ethylene/vinyl acetate copolymers and as low a content as possible of inorganic fillers.

Another object of the present invention is the development of a process for the production of a pulverulent, tricklable mixture of ethylene/vinyl acetate copolymer and polyvinylchloride comprising the steps of mixing a mixture consisting essentially of (a) an ethylene/vinyl acetate copolymer having an acetate content of from 15% to 75% by weight, (b) powdery polyvinylchloride, in a mixture ratio of (a) to (b) of 1:3 to 2:1, and (c) from 0 to 5% by weight of the mixture of additives customary for polymer processing, in a high-speed mixture at temperatures above the softening temperature of said polyvinylchloride and below 170° C, for a time sufficient to effect homogenization, quenching said homogenized mixture with water and removing the water, grinding the quenched product with the addition of from 0.5 to 10 parts by weight of an inert powder having particles in the submicroscopic range, in a high speed mill under passage of an airstream which is heated by friction, and recovering said pulverulent, tricklable mixture.

A further object of the invention is the development of a pulverulent, tricklable mixture of ethylene/vinyl acetate copolymer and polyvinylchloride by the above process.

These and other objects of the invention will become more apparent as the description thereof proceeds.

DESCRIPTION OF THE INVENTION

The subject of the invention is a process for the production of pulverulent, tricklable mixtures of ethylene/vinyl acetate copolymers and polyvinylchloride, optionally with auxiliaries, dyestuffs, stabilizers, plasticizers and ageing inhibitors customary for polymer processing, characterized in that ethylene/vinyl acetate copolymers with an acetate content of between 15% and 75% by weight, preferably 30% to 60% by weight, and polyvinyl chloride, and, optionally, auxiliaries, dyestuffs, stabilizers, plasticizers and ageing inhibitors customary in polymer processing are homogenized in a high-speed mixer at temperatures below 170° C and with a mixture ratio of ethylene/vinyl acetate copolymers to polyvinylchloride of 1:3 to 2:1, preferably 1:2 to 1.5:1, and especially 1:1.2 to 1.2:1, quenched with water and then, with the addition of a powdery material, ground in a high-speed mill, where the mixture is dried in an air stream by friction heating.

More particularly, the subject of the present invention is a process for the production of a pulverulent, tricklable mixture of ethylene/vinyl acetate copolymer and polyvinylchloride comprising the steps of mixing a mixture consisting essentially of (a) an ethylene/vinyl acetate copolymer having an acetate content of from 15% to 75% by weight, (b) powdery polyvinylchloride, in a mixture ratio of (a) to (b) of 1:3 to 2:1, and (c) from 0 to 5% by weight of the mixture of additives customary for polymer processing, in a high-speed mixture at temperatures above the softening temperature of said polyvinylchloride and below 170° C, for a time sufficient to effect homogenization, quenching said homogenized mixture with water and removing the water, grinding the quenched product with the addition of from 0.5 to 10 parts by weight of an inert powder having particles in the submicroscopic range, in a high speed mill under passage of an airstream which is heated by friction, and recovering said pulverulent, tricklable mixture; as well as the powdery mixture so produced.

All ethylene/vinyl acetate copolymers with a content of between 17% and 75% by weight, preferably 30% to 60% by weight, of vinyl acetate in the copolymers and suitable for the improvement of impact resistance are suitable for the production of pulverulent, tricklable mixtures. A suitable pulverulent PVC polymer is, for example, polyvinyl chloride, produced according to the various methods, such as, for example, suspension, emulsion or bulk produced polyvinylchloride. A polyvinylchloride with a high K value has proved to be advantageous. The pulverulent PVC polymer should have particles of a size range of 0.2 mm or below.

The inert powder having particles in the submicroscopic range, is preferably one with a particle size of between 0.2 $\mu$ and 5 $\mu$. Preferably the inert powder should have a high total surface area on the nature of 1 gm having a total surface area in excess of 100 m$^2$. Provided that the total surface area is sufficiently high, the particles can be in the microscopic range of 0.2 mm to 0.2 $\mu$.

Suitable powders are, for example, asbestos, sawdust, siliceous chalk, kaolin, quartz powder, pyrophyllite, kieselguhr, highly dispersed silicic acid, silica gel, talc, chalk, feldspar, heavy spar, gypsum, calcium carbonate, dolomite, pumic, titanium dioxide, zinc oxide, and very finely particled polyvinyl chloride, e.g., the types of PVC customarily used in pastes. Preferably inorganic powders are employed, especially the highly dispersed silicic acids having particle sizes in the range of 15 to 23 mμ and a total surface area of about 350 m² for 1 gm of powder. Such powdery silicic acid is sold under the trademark "Aerosil".

In addition to the polyvinyl chloride and the powder, in many cases stabilizers, ageing inhibitors and processing auxiliaries, such as, for example, lubricants, may be used alone or in admixture. In most cases they are used in quantities of 0.1% to 5% by weight.

Examples of stabilizers are barium-cadmium stabilizers and examples of ageing inhibitors are sterically hindered phenols.

It has surprisingly been found that the mixtures according to the invention can be ground to form a free-flowing powder even at temperatures above the embrittling temperature and that, as the grinding temperature increases, the fineness of the pulverulent material obtained passes through a maximum. This is the case, for example, with the mixing, according to the invention, of ehtylene/vinyl acetate copolymers with 30% to 60% by weight of vinyl acetate in the copolymer and pulverulent polyvinyl chloride having a main sieve fraction below 150 μ. When using these components homogenization is carried out, for example, at temperatures between 100° C and 170° C, preferably 130° C to 150° C.

Even though mixtures with an ethylene/vinyl acetate copolymer content of up to 2:1 may be produced by the process according to the invention, it has proved advantageous in practice to produce an impact-resistant, modified PVC mixture by mixing ethylene/vinyl acetate copolymer and polyvinylchloride, which mixtures contain an approximately 50% by weight portion of elastomers.

The components are worked up in a high-speed mixer to form a homogeneous mixture. A decisive factor for obtaining a homogeneous mixture is the mixing temperature reached. It must be at least above the softening temperature of the polyvinylchloride. The mixtures according to the invention present no complications with regard to further processing, such as, for example, separation into component parts during storage and transport. The mixtures are completely homogeneous per se.

However, in this form the material is too tacky and, in heating mixers and when cooling, it is prone to the known snowball effect which results in the undesired coarsening of the fine-particled material. In order to counteract this the material is cooled by pouring water over it after reaching the optimum mixing temperature. At a final temperature of the mixture of, for example, 140° C, a quantity of water is added which is about two to three times as great as the quantity of the mixture. After the mixture has cooled to about 40° C, water can be removed in known manner by centrifuging or sieving (for example, a sieve with 500 μ mesh size) until there is a residual water content of 6 to 18%.

In order to convert the material thus prepared into the desired fine-particled form, it is crushed in a grinding process. The material does not have to be dried in a separate process since crushing takes place for the most part in an air stream with simultaneous friction heating of the ground material. The water present evaporates into the air stream. It is recommended to connect two mills one behind the other and in this case the grinding temperature of the first mill should be higher than that of the second mill.

In the grinding process it has proved favorable to add a powder. The powder is an inert powder having particles in the submicroscopic range and is added in amounts of from 0.5 to 10 parts by weight of the mixture. Surprisingly, in the case of the process according to the invention, an addition of less than 4% of powder is sufficient in order to obtain a pulverulent, free-flowing mixture product. This mixture product is advantageously suitable as an addition to polymers, in any desired proportion, to produce impact-resistant mixtures.

The following examples are illustrative of the practice of the invention without being limitative.

EXAMPLE 1

7.5 kg of a PVC emulsion polymer with a K value of 70, 7.5 kg of an ethylene/vinyl acetate copolymer with 45% by weight of vinyl acetate in the polymer, and 0.3 kg of a barium/cadmium stabilizer are placed in a 75-liter Henschel fluid mixer and are mixed intensively over a period of ten minutes to 140° C at a speed of 1,600 r.p.m. After the mixture exceeds a temperature of approximately 120° C, homogenization of both resins occurs with increasing tackiness and the formation of coarse agglomerates. When the final temperature is reached, the mixture, with the mixer still operating, is quenched to 56° C by pouring 33 liters of water over it and the mixture is then poured off through a sieve with 500 μ mesh size. The resulting coarse particles have a residual water content of 18% and a temperature of 40° C.

Afterwards, the mixture is continuously fed into an ultrarotor and ground at a temperature of 80° C while simultaneously metering in 4% of highly dispersed silicic acid. In a second mill of the same type and connected in series, grinding is continued at 66° C until the desired fineness is reached. The total throughput of this arrangement is 145 kg/h. A dry, free-flowing polyvinylchloride/ethylene/vinyl acetate mixture with approximately 50 parts by weight of ethylene/vinyl acetate copolymer is obtained as the ground material and has the following values:

(a) Sieve analysis:

| μ | 500 | 315 | 200 | 100 | 63 | diff. |
|---|---|---|---|---|---|---|
| % | 4.0 | 22.5 | 38.0 | 22.0 | 5.0 | 8.5 |

(b) Bulk density: 0.488 gm/cm³
(c) Weight after tamping: 0.575 gm/cm³
(d) Moisture (1 hr/120° C): 0.29%
(e) Chlorine content: 26.28%
(f) SiO₂ content: 3.92%

In order to determine the notch impact strength, 10 parts by weight of the mixture according to the invention were rolled with a hard PVC basic mixture for 9 minutes at 175° C and then compressed at 175° C. The hard PVC basic mixture consists of the following components:

| Parts by Weight | |
|---|---|
| 90 | Suspension PVC polymer |
| 2 | Barium/cadmium stabilizer |
| 0.5 | Chelating agent, organic phosphite |
| 1.5 | Epoxidized soya oil |
| 0.5 | 12-hydroxystearic acid |
| 0.5 | Cadmium stearate |
| 0.3 | Montan wax |
| 0.2 | Polyethylene wax |
| 3 | Titanium dioxide |

The pressure plate produced therefrom yielded the following notch impact strengths:
at 23° C: 13.6 kJ/m$^2$
at 0° C: 6.2 kJ/m$^2$
whereas an impact resistant molding material with 10 parts by weight of a commercial vinyl chloride/ethylene/vinyl acetate/graft polymer yielded the notch impact strength values of 13.7 kJ/m$^2$ at 23° C and 5.4 kJ/m$^2$ at 0° C.

The decisive 0° C value of the notch impact strength shows an improvement when the mixture according to the invention is used compared with the use of a graft polymer of approximately the same monomer ratio.

EXAMPLE 2

7.5 kg of a polyvinylchloride suspension polymer with a K value of 70, 7.5 kg of an ethylene/vinyl acetate/copolymer with an acetate content of 45% by weight, and 0.3 kg of a barium/cadmium stabilizer are prepared as described in Example 1 in a Henschel fluid mixer. The final mixing temperature was 150° C. The mixture was quenched and ground as in Example 1. The finished ground material yielded the following values:

(a) Sieve analysis:

| $\mu$ | 500 | 315 | 200 | 100 | 63 | D |
|---|---|---|---|---|---|---|
| % | 26 | 28 | 13 | 24 | 7.5 | 1.5 |

(b) Bulk density: 0.47 gm/l
(c) Weight on tamping: 0.54 gm/l
(d) Moisture (1 hr/120° C): 0.23%
(e) Chlorine content: 26.2%
(f) SiO$_2$ content: 3.96%
(g) Notch impact strength with a formulation as in Example 1:
at 23° C: 7.2 kJ/m$^2$
at 0° C: 3.7 kJ/m$^2$
were found.

EXAMPLE 3

6.0 kg of a suspension polymer with a K value of 70, 9.0 kg of an ethylene/vinyl acetate copolymer with an acetate content of 45% by weight, 0.3 kg of a barium/cadmium stabilizer, and 0.015 kg of an antioxidant (3,5-tert.-butyl-n-hydroxy-phenylpropionic acid stearyl ester) were prepared in a 75-liter Henschel fluid mixer as in Example 1. The mixing temperature attained 140° C. After quenching and grinding as in Example 1, the ground material had the following values:

(a) Sieve analysis:

| $\mu$ | 500 | 315 | 200 | 100 | 63 | D |
|---|---|---|---|---|---|---|
| % | 39.5 | 14 | 21.5 | 16 | 6.5 | 2.5 |

(b) Bulk density: 0.51%
(c) Weight on tamping: 0.52 gm/liter
(d) Moisture (1 hr/120° C): 0.32%
(e) Chlorine content: 18.8%
(f) SiO$_2$ content: 3.59%
(g) Notch impact strength with a formulation according to Example 1:
at 23° C: 11.4 kJ/m$^2$
at 0° C: 5.0 kJ/m$^2$
were found.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of a pulverulent, tricklable mixture of ethylene/vinyl acetate copolymer and polyvinylchloride comprising the steps of mixing a mixture consisting essentially of (a) an ethylene/vinyl acetate copolymer having an acetate content of from 15% to 75% by weight, (b) powdery polyvinylchloride, in a mixture ratio of (a) to (b) of 1:3 to 2:1, and (c) from 0 to 5% by weight of the mixture of additives customary for polymer processing, in a high-speed mixture at temperatures above the softening temperature of said polyvinylchloride and below 170° C, for a time sufficient to effect homogenization, quenching said homogenized mixture with water and removing the water, grinding the quenched product with the addition of from 0.5 to 10 parts by weight of an inert powder having particles in the submicroscopic range, in a high speed mill under passage of an airstream which is heated by friction, and recovering said pulverulent, tricklable mixture; as well as the powdery mixture so produced.

2. The process of claim 1 wherein said ethylene/vinyl acetate copolymer has an acetate content of from 30% to 60% by weight.

3. The process of claim 1 wherein said mixture ratio of (a) to (b) is from 1:2 to 1.5:1.

4. The process of claim 1 wherein said mixture ratio of (a) to (b) is from 1:1.2 to 1.2:1.

5. The process of claim 1 wherein about 4 parts by weight of said inert powder is employed.

6. The process of claim 1 wherein said inert powder is highly-dispersed silic acid.

* * * * *